(12) United States Patent
Lhomme et al.

(10) Patent No.: US 7,490,897 B2
(45) Date of Patent: Feb. 17, 2009

(54) CHILD CAR SEAT PIVOTING BETWEEN A UTILISATION POSITION AND AT LEAST ONE INSTALLATION POSITION AND POSSESSING A TWIN LOCKING MODE

(75) Inventors: Gilles Lhomme, Chateau D'Olonne (FR); Richard Biaud, Trementines (FR)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 11/766,066

(22) Filed: Jun. 20, 2007

(65) Prior Publication Data
US 2008/0054692 A1 Mar. 6, 2008

(30) Foreign Application Priority Data
Sep. 1, 2006 (FR) .................................. 06 07696

(51) Int. Cl.
*A47D 1/10* (2006.01)
(52) U.S. Cl. .................... 297/256.12; 297/256.13; 297/256.16
(58) Field of Classification Search ............ 297/256.12, 297/256.13, 256.16
See application file for complete search history.

(56) References Cited

U.S. PATENT DOCUMENTS

| | | | | |
|---|---|---|---|---|
| 1,756,807 A | * | 4/1930 | Black et al. ................. 297/329 |
| 2,153,155 A | * | 4/1939 | Page et al. .................. 297/342 |
| 2,182,598 A | * | 12/1939 | Owler ........................ 297/343 |
| 2,229,608 A | * | 1/1941 | Ragsdale et al. .............. 297/62 |
| 2,374,848 A | * | 5/1945 | Aage .......................... 297/343 |
| 2,583,372 A | * | 1/1952 | Hall .............................. 297/14 |
| 2,712,346 A | * | 7/1955 | Sprinkle .................. 297/344.12 |
| 2,725,921 A | * | 12/1955 | Markin .................... 297/216.15 |
| 2,859,797 A | * | 11/1958 | Mitchelson .................... 297/61 |
| 3,404,917 A | * | 10/1968 | Smith ................... 297/256.13 X |
| 3,567,280 A | * | 3/1971 | Bradshaw .................... 297/318 |
| 3,596,986 A | * | 8/1971 | Ragsdale .................. 297/183.6 |
| 4,058,342 A | * | 11/1977 | Ettridge .................. 297/256.13 |

(Continued)

FOREIGN PATENT DOCUMENTS

EP 1247688 10/2002

(Continued)

OTHER PUBLICATIONS

International Search Report for French Application 0607696, dated Apr. 11, 2007.

*Primary Examiner*—Rodney B. White
(74) *Attorney, Agent, or Firm*—Barnes & Thornburg LLP

(57) ABSTRACT

A child car seat includes a base and a seat pivotally disposed on the base such that the seat may pivot between a utilization position, where the seat faces a road, and an installation position, where the seat is turned toward a door of the vehicle. The seat includes a first locking element disposed on a vertical part of the base and a second locking element disposed on the backrest. The first locking element comprises a frontal guiding surface and a lateral guiding surface and the second locking element comprises a mobile part that interacts with the frontal guiding surface. The frontal and lateral guiding surfaces cause the first and second locking elements to engage in a locked position as the seat is moved to the utilization position. The first and second locking elements are in an unlocked position as the seat is moved to the installation positional.

13 Claims, 7 Drawing Sheets

U.S. PATENT DOCUMENTS

Figure 1:
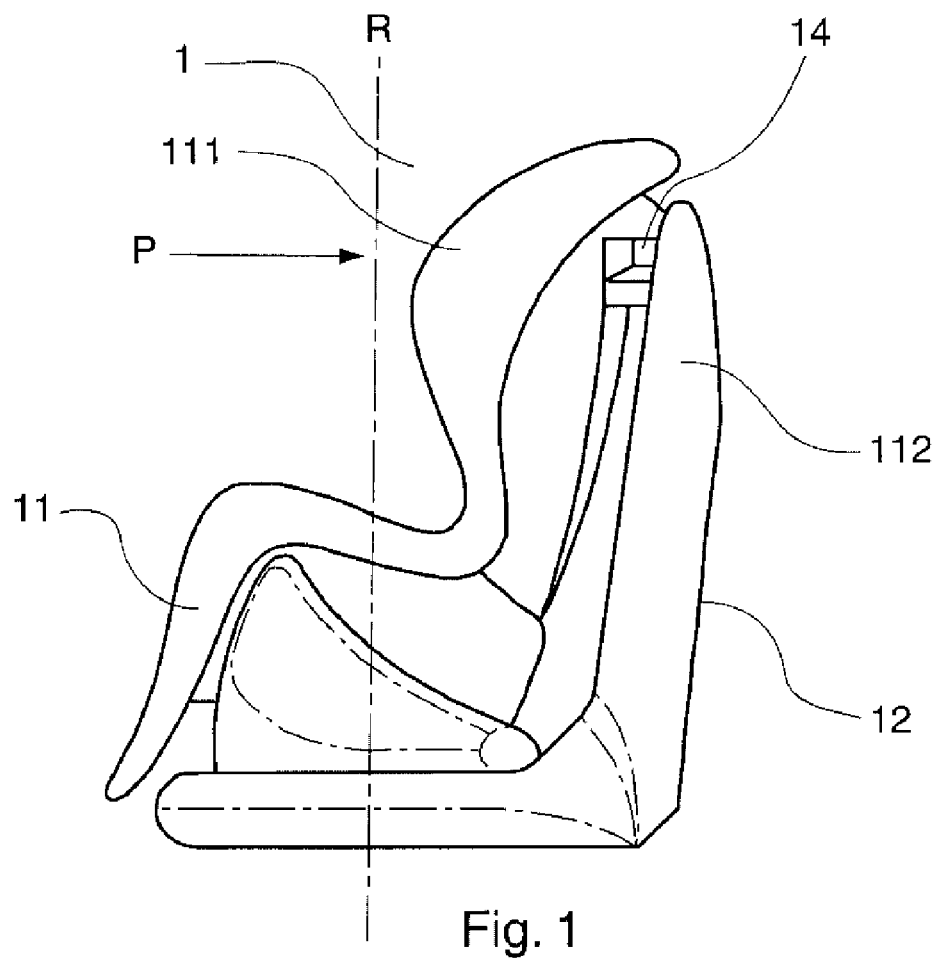

| | | | |
|---|---|---|---|
| 4,113,306 A * | 9/1978 | von Wimmersperg | 297/250.1 X |
| 4,205,877 A * | 6/1980 | Ettridge | 297/256.13 X |
| 4,345,791 A * | 8/1982 | Bryans et al. | 297/256.16 X |
| 4,362,336 A * | 12/1982 | Zapf et al. | 297/317 |
| 4,452,486 A * | 6/1984 | Zapf et al. | 297/343 |
| 4,480,870 A * | 11/1984 | von Wimmersperg | 297/256.13 X |
| 4,762,364 A * | 8/1988 | Young | 297/256.12 |
| 4,915,446 A * | 4/1990 | Darling et al. | 297/256.13 X |
| 4,971,392 A * | 11/1990 | Young | 297/256.12 |
| 5,029,928 A * | 7/1991 | Huber | 296/63 |
| 5,031,960 A * | 7/1991 | Day | 297/256.13 X |
| 5,498,052 A * | 3/1996 | Severini et al. | 297/324 X |
| 5,524,964 A * | 6/1996 | Weimersheimer | 297/256.12 |
| 5,803,543 A * | 9/1998 | Hartmann | 297/256 |
| 6,196,629 B1 * | 3/2001 | Onishi et al. | 297/256.12 |
| 6,241,314 B1 * | 6/2001 | Pufall | 297/256.12 |
| 6,322,142 B1 * | 11/2001 | Yoshida et al. | 297/256.13 X |
| 6,431,647 B2 * | 8/2002 | Yamazaki | 297/256.12 |
| 6,505,887 B2 * | 1/2003 | Hampton | 297/256.12 X |
| 6,572,189 B1 * | 6/2003 | Blaymore | 297/256.12 |
| 6,695,378 B2 * | 2/2004 | Hanagan | 296/65.01 |
| 6,746,080 B2 * | 6/2004 | Tsugimatsu et al. | 297/256.13 |
| 6,773,065 B1 | 8/2004 | Stamper | |
| 7,073,859 B1 * | 7/2006 | Wilson | 297/256.12 X |
| 7,108,326 B2 * | 9/2006 | Schurg | 297/325 X |
| 7,163,265 B2 * | 1/2007 | Adachi | 297/256.12 |
| 7,229,118 B2 * | 6/2007 | Saberan et al. | 297/336 X |
| 7,246,855 B2 * | 7/2007 | Langmaid et al. | 297/256.13 |
| 7,270,371 B2 * | 9/2007 | Adragna et al. | 297/317 X |
| 7,344,192 B2 * | 3/2008 | Kespohl | 297/256.13 X |
| 7,357,451 B2 * | 4/2008 | Bendure et al. | 297/256.12 |
| 7,374,245 B2 * | 5/2008 | Tanaka et al. | 297/343 |
| 2005/0225139 A1 * | 10/2005 | Biaud | 297/256.12 |
| 2006/0170262 A1 * | 8/2006 | Gold et al. | 297/256.12 |

FOREIGN PATENT DOCUMENTS

| | | |
|---|---|---|
| EP | 1625967 | 2/2006 |
| EP | 1625968 | 2/2006 |
| WO | 2005000627 | 1/2005 |

* cited by examiner

CHILD CAR SEAT PIVOTING BETWEEN A UTILISATION POSITION AND AT LEAST ONE INSTALLATION POSITION AND POSSESSING A TWIN LOCKING MODE

FIELD OF THE INVENTION

The field of the invention is child care. More precisely, the invention concerns a child car seat intended to be installed in a motor vehicle.

Still more precisely, the invention concerns a pivoting child car seat that is mobile in order to allow an installation position (facing the door) and a utilisation position (facing the road).

PRIOR ART

With child car seats, one of the difficulties is accessibility, particularly due to the limited space between the car door and vehicle seat. It is generally not easy to install a child in a child car seat or to lift it out of it.

To facilitate the installation of the child, it is therefore proposed to have the child car seat pivot on a base or fixed structure, the child car seat thus being moveable between:
- at least one child installation position, facing a side door (there are generally two installation positions, the child car seat thus being able to rotate to the left or the right); and
- a transportation, travel or utilisation position, facing the road.

For safety reasons, it is desirable that the seat base retains the seat on at least two areas, at the lower part (at seat level) and at the upper part (in proximity to the backrest). To do this, the base presents two significantly perpendicular portions, one resting on the seat of the vehicle, and receiving the seat of the child car seat, and the other extending vertically along the backrest of the vehicle seat. This latter part of the base comprises in its upper part a means for fixing it to the upper part of the backrest of the child car seat.

Solutions for fixing the back of the child car seat with the base have been envisaged. Some of these implement sliding systems in the upper part of the backrest of the child car seat and intended to cooperate with a clasp forming part of the base and that locks when the child car seat pivots between the installation and the utilisation position.

Such a technique is for example given in patent document EP-1625968.

This double linkage (lower part and upper part) obviously reinforces safety, particularly in the case of an impact. However, it can happen that incorrect manipulation of the child car seat leads to the system connecting the backrest to the base either not locking or incorrectly locking with the base.

In fact, the locking of such a fixation system supposes that the user correctly pivots the child car seat towards its utilisation position, so that the sliding system properly cooperates with the hooking part so that they lock together. But some users, in certain cases of misuse, rare but possible as shown in tests carried out on products, may force the backrest away from the base so that the child car seat pivots but without the slide and clasp system engaging so that the child car seat arrives in the utilisation position without the fixation system being locked.

Even if the user realises the error of manipulation, they cannot themselves then ensure proper locking without having to carry out the entire manoeuvre again and thus pivot the child car seat back to its installation position and then to its facing the road position so that the locking system locks.

Through negligence or carelessness, it is thus possible in certain rare cases that the child car seat may be used without the fixation system being locked.

AIMS OF THE INVENTION

The invention particularly has as its objective to overcome the disadvantages contained in prior art.

It is important to note that the identification of the above problem forms part of the invention. In fact, the problem of incorrect use of a pivoting child car seat, and therefore the possibility that, in certain cases, the locking may not be correctly carried out despite the means employed for guiding and pivoting, is not obvious to a person skilled in the art, who considers that the presence of such guiding means resolves the problem of the locking of the upper part. The present inventors have detected this new and specific problem.

More precisely, one aim of the invention is to provide a pivoting child car seat that has good safety qualities, particularly one whose seat is efficiently and systematically locked in its upper backrest part, regardless of any eventual careless manipulation.

Another aim of the invention is to provide a pivoting child car seat whose upper part of the backrest and base may be affixed regardless of the manner in which it is pivoted and manipulated from the installation position to the travel position.

Yet another aim of the invention is to provide such a child car seat whose upper part of the backrest and base may be affixed together after the seat has been placed facing the road.

A secondary objective of the invention is to provide a child car seat that allows the user to know whether the upper part of the backrest is correctly affixed to the base when in its utilisation position.

The invention has still another aim which is to provide such a child car seat that is relatively inexpensive to manufacture and that is reliable over time.

PRESENTATION OF THE INVENTION

These aims, along with others that will be shown in the following, are obtained by using a child car seat comprising a base and a seat that pivots in relation to the base in such a way as to assume at least two positions:
- a utilisation position, in which said seat faces the road, and in which position the locking means comprise a locking element that forms part of the upper part of the backrest of said child car seat and a locking element that forms part of said base and both of which lock
- at least one installation position, in which said seat is turned towards the door of the vehicle, and in which said locking elements are unlocked.

According to the invention, the first of said locking elements comprises at least two guiding surfaces in which:
- a frontal guiding surface cooperates with at least one mobile part of said second locking element, when said seat moves into said utilisation position via the moving of said backrest in a direction significantly perpendicular to said backrest
- a lateral guiding surface that cooperates with at least one of said mobile parts, when said seat moves into said utilisation position via movement of said backrest in a direction significantly parallel to said backrest said guiding surfaces being configured so as to bring said locking elements into the locked position as soon as said seat is in said utilisation position.

Thus, the fixation of the upper part of the backrest of the child car seat, according to the invention, with the base is carried out via two locking (or latching) modes:

- a first locking mode, known as normal, and in which the locking elements of the backrest of the child car seat and the base are automatically affixed to the utilisation position during the transition from one of the installation positions to the utilisation position
- a second locking mode, known as downgraded, and in which the locking elements of the backrest and the base are affixed as soon as the seat is in the utilisation position, under the effect of pressure exercised in a significantly perpendicular direction to the backrest of the seat, tending to bring it together with the backrest of the base.

The fixation of the upper part of the child car seat, according to the invention, to the base can therefore be correctly carried out when in the utilisation position, regardless of the circumstances in which the child car seat pivots from the installation position to the utilisation position.

This approach therefore confers good safety qualities upon a child car seat according to the invention.

According to a preferred approach to the invention, said seat can assume at least two installation positions, via rotating either to the left or to the right in relation to said base, and in which said first locking element comprises two lateral guiding surfaces that respectively cooperate with at least one of said mobile parts, depending on whether said seat is pivoted from one or the other of the two said installation positions.

The child car seat can thus be placed either on the right or left side of the vehicle passenger compartment thus providing great modularity.

Advantageously, said mobile parts are associated with means of return that tend to bring them into said locked position.

Thus, as soon as the seat moves into the utilisation position, said mobile parts automatically move into the locking position, so that the upper part of the backrest of the seat is positively connected to the base.

According to one advantageous aspect of the invention, the child car seat comprises a locking means that allows it to move said mobile parts into said unlocked position.

It then becomes easy to pivot the child car seat into the installation position.

Preferably, said unlocking means are controlled in a remote manner via a control cable.

This approach confers on the child car seat good ergonomic qualities, and it is simple and inexpensive to implement.

According to one variant of the invention, the child car seat comprises a visual means of checking the locking or unlocking of said locking means.

A user may then easily check that the upper part of the backrest is correctly affixed to the base. This may avoid a user driving with the child car seat unlocked, and thus improve safety for a child placed in the seat.

According to one particular means of realising the invention, said lateral guiding surface(s) form at least one slide rail leading to at least one lock housing.

The locking elements may thus be easily brought into the locked position when the seat is in its utilisation position.

According to one particular approach to the invention, said second locking element forms a hook that has at least two mobile teeth that cooperate with said lock housing in said locked position.

According to another advantageous approach to the invention, said mobile part is a hook pivoting around a perpendicular shaft, with at least one extremity cooperating with at least one of said housings in the locked position.

According to another preferred approach of the invention, said mobile part is a hook pivoting around a horizontal shaft, and cooperating with a portion of said first locking element and forming a significant U-shape when in said locked position.

These approaches, simple to implement, permit effective fixation to be ensured between the upper part of the backrest and the base when the seat is in the utilisation position.

In one advantageous mode of realising the invention, said seat comprises an indexing means that controls the correct placing of said seat in said utilisation position.

This ensures the proper positioning of the seat in the utilisation position when its direction is pivoted and guarantees the proper locking of the fixation system of the upper part of the backrest of the seat with the base.

Preferably, said indexing means may assume two positions, one position in which it authorises a rotation of said seat to the right and one position in which it authorises a rotation of said seat to the left.

The child car seat may thus be placed to the right or left side of the passenger compartment, which confers great modularity on the system.

LIST OF FIGURES

Figure 2:
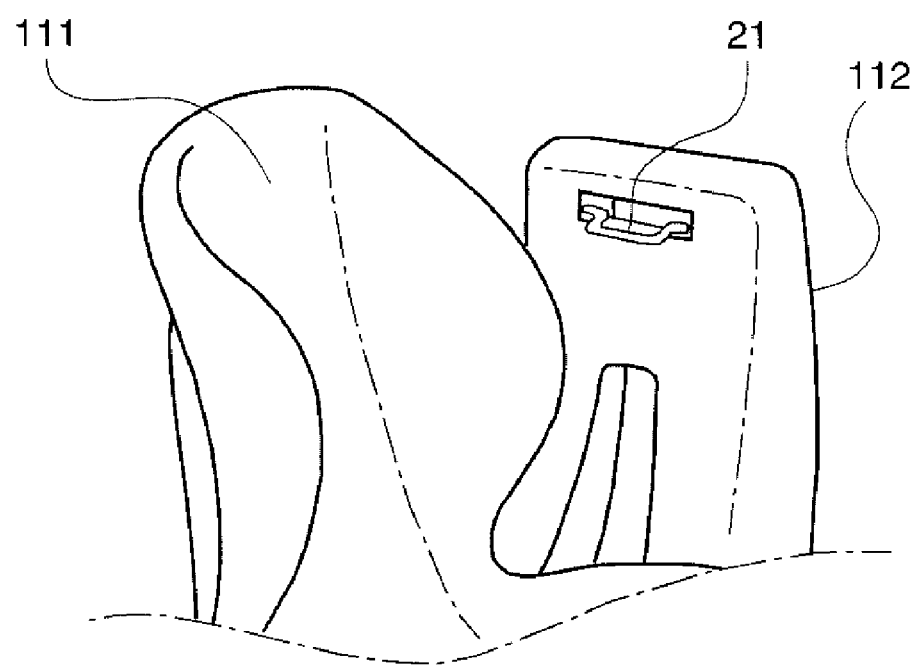
Figure 3:
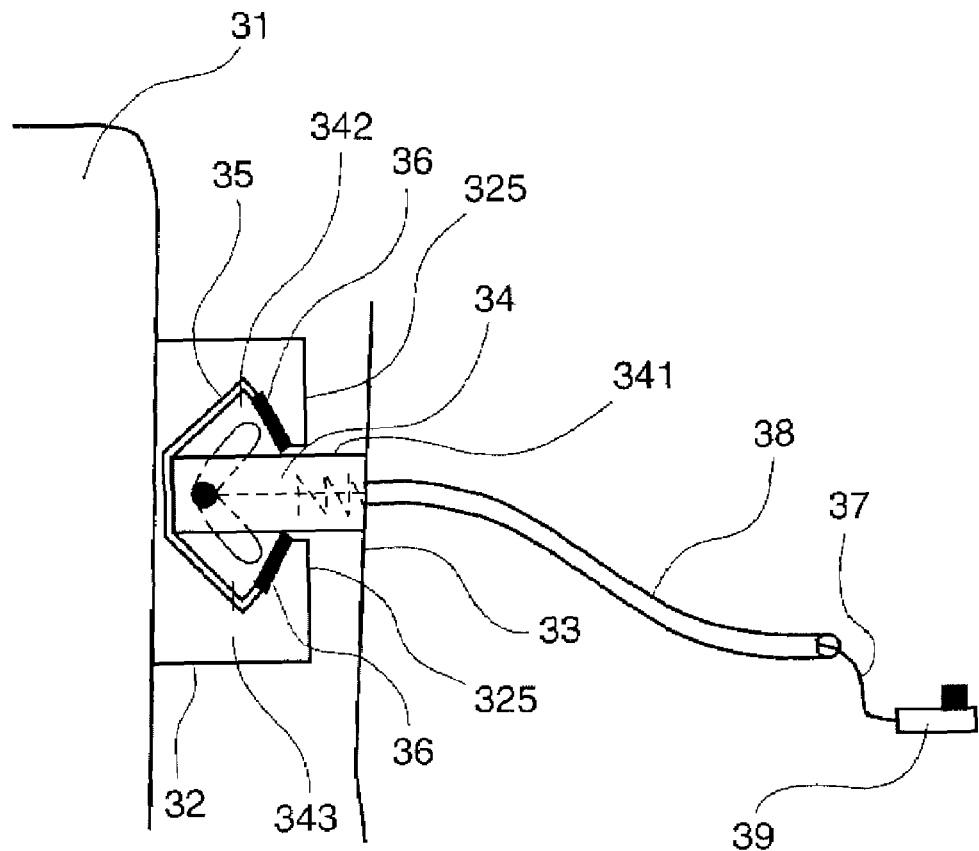
Figure 4:
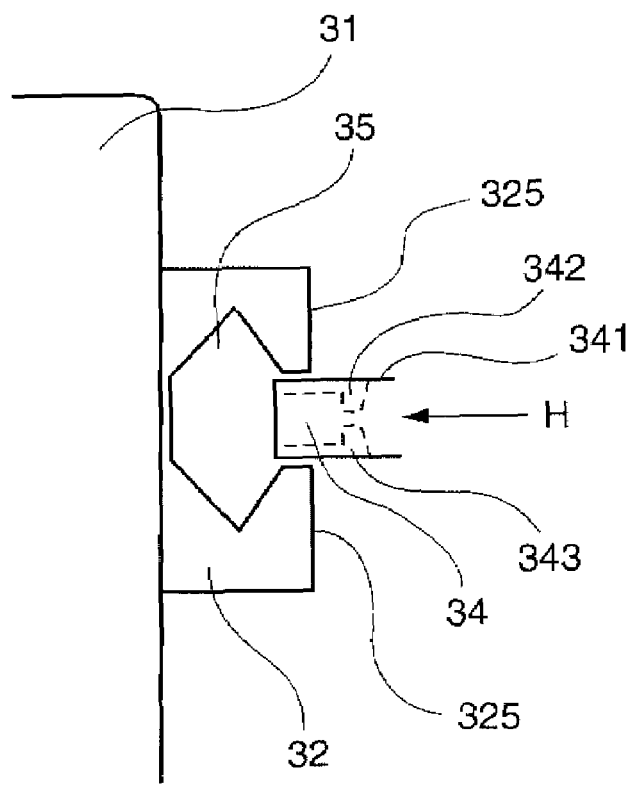
Figure 5:
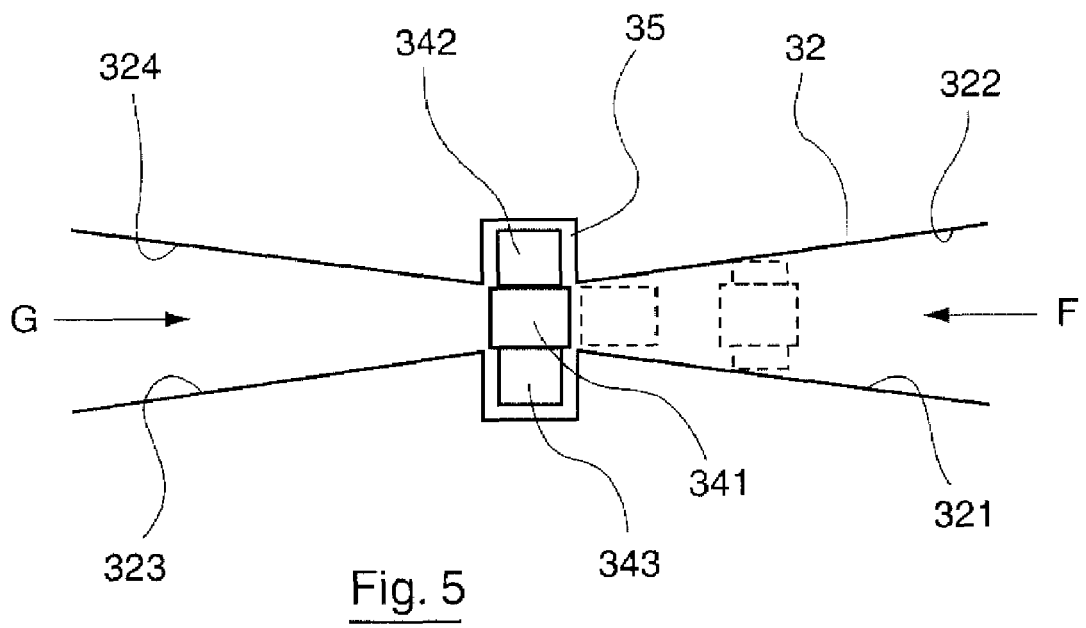
Figures 9A, 9B:
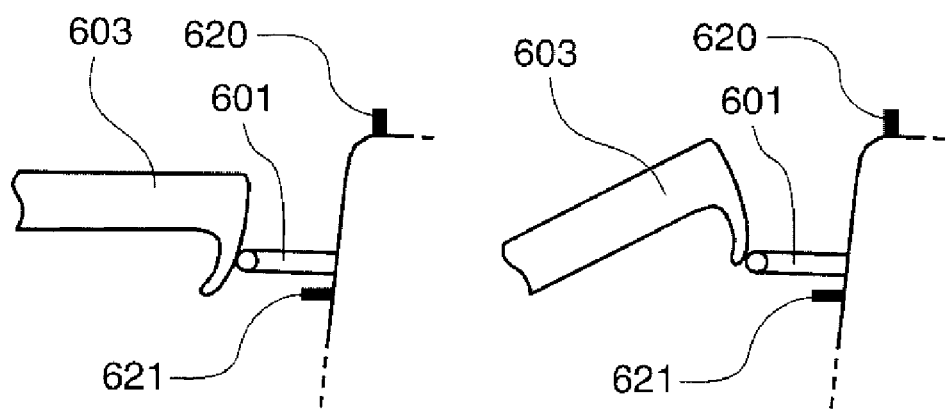
Figure 10:
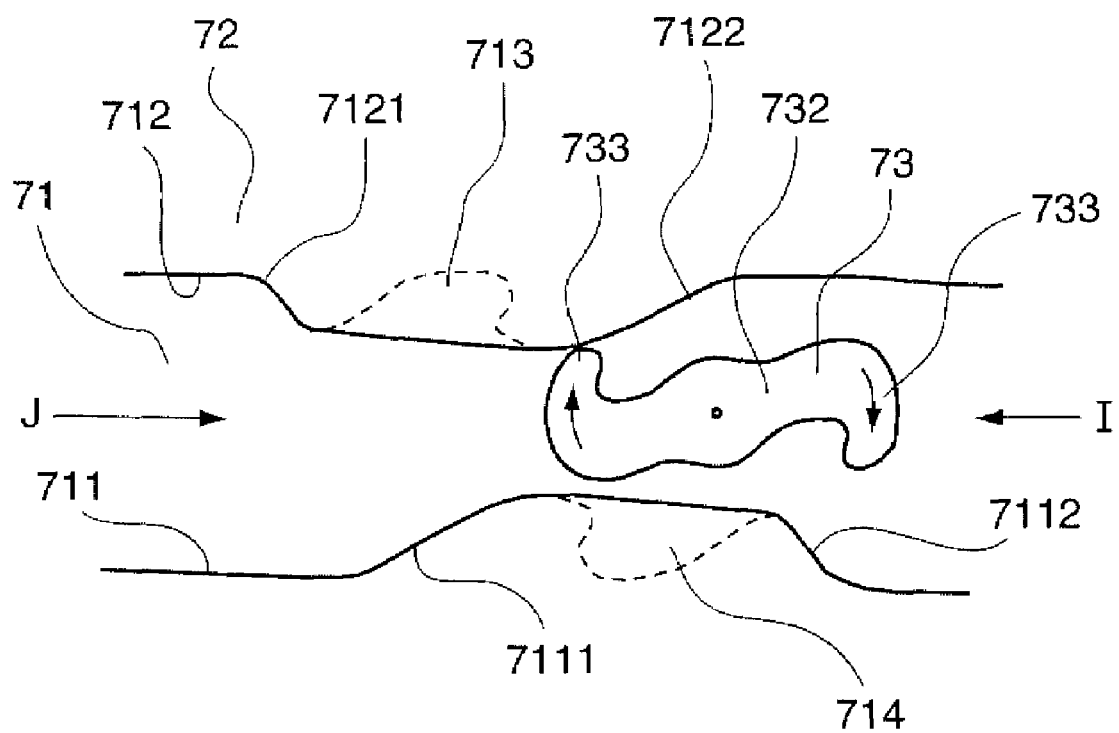
Figure 11:
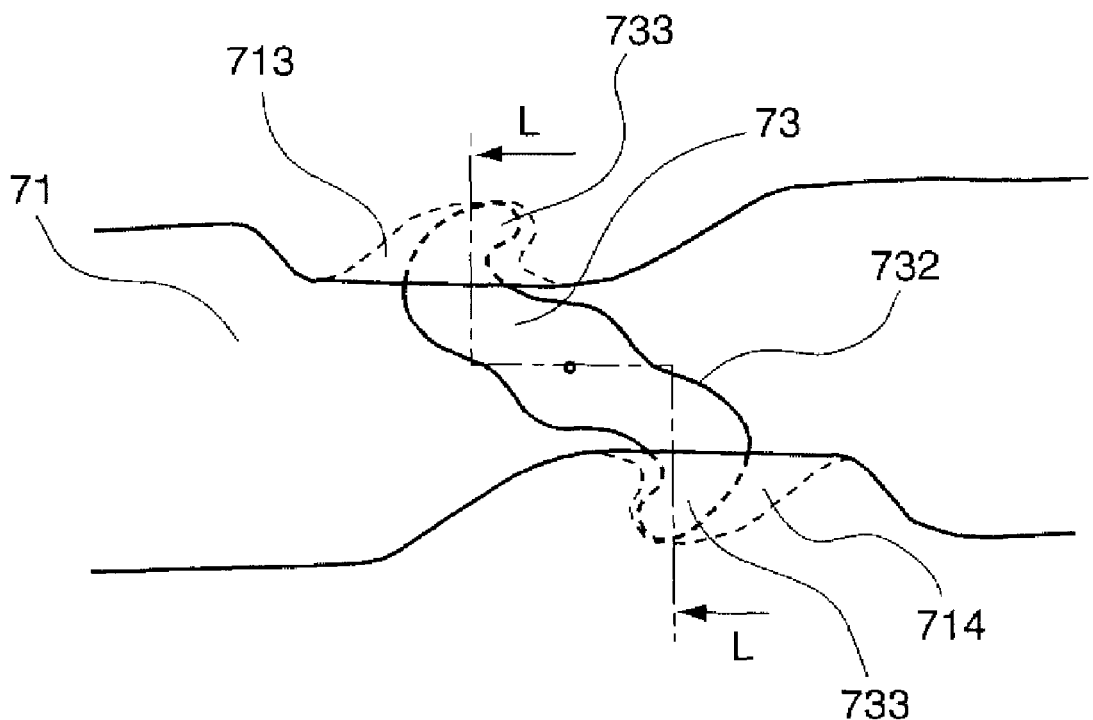
Figure 12:
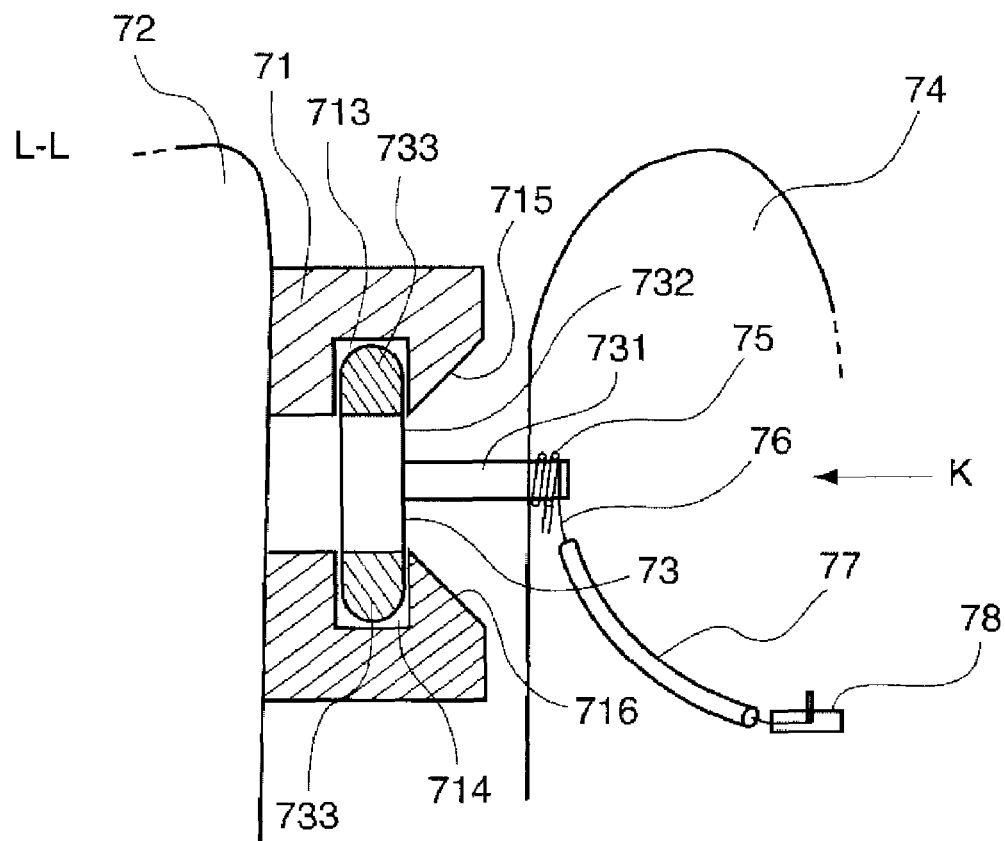
Figures 13A, 13B:
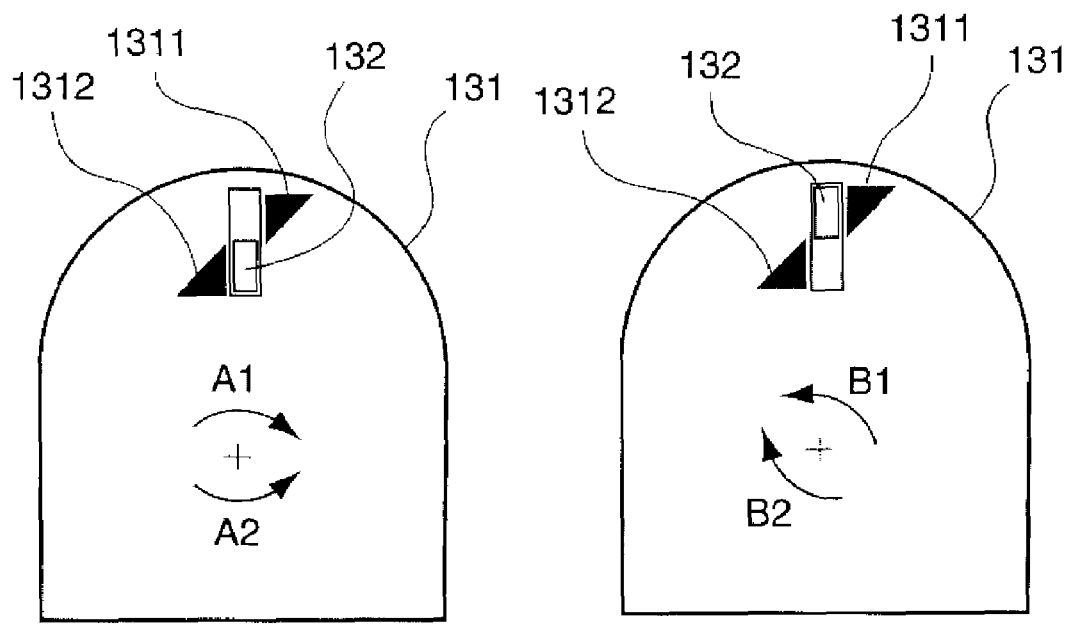

Other characteristics and advantages of the invention will become clearer on reading the following description of the preferential means of realising the invention, here provided as simple, non-limiting examples, along with the enclosed drawings, in which:

FIGS. 1 and 2 respectively show a child car seat according to the invention placed in the utilisation position and an upper portion of the seat in the installation position FIGS. 3 to 5 show different views of the fixation system implemented in this first means of realising the seat, according to the invention, in which a mobile hook having retractable teeth forms part of the child car seat FIGS. 6 to 9*b* show several views of a fixation system implemented in a second means of realising the child car seat, according to the invention, in which a mobile hook forms part of the base of the car child car seat FIGS. 10 to 12 show three views of a locking system for the upper part of the seat implemented in a third embodiment of a child car seat according to the invention, in which the base has a counter shape forming a guide for a mobile hook affixed to the seat of the child car seat and permitting transition to an unlocked position from a locked position FIGS. 13*a* and 13*b* show one mode of realising the invention in which the child car seat, according to the invention, implements an indexing means associated with rotation of the seat.

DESCRIPTION OF SEVERAL EMBODIMENTS THE INVENTION

Reminder of the Principle of the Invention

The invention thus concerns a child car seat pivoting between at least one installation position, in which it faces the door of the vehicle to permit the installation or removal of the child, and a utilisation position, it which it faces the road. This seat comprises locking elements that permit of the upper part of the backrest to be affixed to the base when in the utilisation position.

According to the invention, the locking elements can lock in two different ways. In the first locking mode, known as normal, the locking elements lock (or affix) automatically in the utilisation position during the movement of the seat from one of the installation positions to the utilisation position (facing the road). In a second locking mode, known as downgraded, the locking elements lock automatically as soon as the seat is in the position facing the road, under the effect of pressure, due for example to the elasticity of the backrest of the child car seat, exercised on the backrest of the child car seat in a direction significantly perpendicular to the backrest.

This second mode of locking has the advantage of guaranteeing the proper locking of the seat, if a user does not respect the normal conditions of use. Thus, the risk for the child is eliminated even in the case of misuse.

Thus, whatever the circumstances in which the child car seat pivots from one of the installation positions to the utilisation position, the locking elements of the upper part of the backrest of the child car seat, according to the invention, affix to the base in a satisfactory manner FIGS. 1 and 2 illustrate the general principle of the invention.

As shown in these figures, the seat 11 of a pivoting child car seat 1 is pivotally mounted on a base 12, between a position facing the road (FIG. 1) and a position facing the door of the vehicle (FIG. 2). A first locking element, formed for example, by a fixed anchor point 14, in affixed to the backrest 111. A mobile hook 21 is affixed to a vertical part 112 of base 12. This hook 21 is moveable between an unlocked position in which it is remote from anchor point 14, and a locked position in which it cooperates with anchor point 14.

In the various embodiments the invention presented further on, the hook may be affixed either to the seat or to the base and the anchorage may be equally affixed to the seat or the base.

Both previously mentioned locking modes (normal and downgraded) will now be illustrated.

When seat 11 of the child car seat 1 pivots around axis R, i.e., in a direction significantly parallel to backrest 111 of seat 11, to move from the installation position to the utilisation position, the hook 21 moves into the locked position in which it cooperates or affixes to anchor point 14.

Due to misuse, it might happen that hook 21 does not engage with anchor point 14 during the pivoting. In this case, a pressure in the direction of arrow P, for example, due to the elasticity of backrest 111 of seat 11, will tend to slightly move backrest 111 of seat 11 in a direction significantly perpendicular to backrest 111, and force the passage of hook 21 into the locked position, i.e., into positive engagement with anchor point 14, when the car child seat is in the utilisation position.

Thus, if hook 21 and anchor point 14 do not fixedly connect during the pivoting, the user does not have to replace the car child seat in the installation position and then re-pivot it into the utilisation position so that hook 21 moves to the locked position It enters the locked position as soon as the user ceases to hold apart the two elements (for example under the effect of the elasticity of the parts).

Once in the locked position, hook 21 prevents any rotation of seat 11 of the child car seat 1 towards the front of the vehicle, such as might take place during an impact produced for example during an accident.

1$^{st}$ Embodiment: Harpoon Points

We show in FIGS. 3 to 5 one embodiment of the child car seat according to the invention.

In this particular embodiment, a first locking element 32 is affixed to the face turned towards the interior of the passenger compartment of the vehicle of a part of base 31 intended to press against the backrest of a vehicle seat (not shown here).

The locking element 32 here takes the form of a slide having four lateral guiding surfaces 321, 322, 323, 324. The cross section of slide 32 diminishes at each of its extremities in order to enter cavity 35 that is significantly located on its centre line.

A second locking element here takes the form of a hook 34, affixed to backrest 33 of the seat. Hook 34 is here formed from a metal shaft 341 having a significantly square cross section, for example, on which are mounted two mobile teeth 342 and 343 in the deployed position (FIG. 3) and the retracted position (FIG. 4) in which they are retracted into shaft 341. Shaft 341 is welded to the structure of backrest 33 of the seat. Other means of fixation and other suitable materials could of course be used.

The mobile teeth 342 and 343 are each linked to an extending means, using for example a spring (not shown in the figures) that tends to hold them in the deployed position.

Slide 32 is intended to cooperate and form a means of guiding hook 34 thus bringing it in an affixed position when the car child seat is brought from the installation position to the utilisation position.

In a manner so as to reinforce slide 32, the parts of slide 32 coming into contact with hook 34 are covered by gates, taking here the form of two metal plates 36. Other means may be used with an aim to limiting the wear generated by the friction of hook 34 on slide 32.

In the normal locking mode, hook 34 affixes to the slide when the child car seat pivots from the installation position to the utilisation position. During this movement, hook 34 engages in slide 32 in the direction of arrows F or G, depending on whether the seat is positioned on the left or the right side of the passenger compartment of the vehicle. Due to the fact that the cross section of slide 32 becomes narrower, the mobile teeth 342 and 343 progressively move from the deployed position to the retracted position (FIG. 5), until hook 34 reaches cavity 35, in which teeth 342 and 343 are brought into the deployed position under the effect of the compression springs (FIG. 3). Hook 34 is then in a locked (or affixed) position and the child car seat is locked in the utilisation position.

In the downgraded locking mode, hook 34 moves in the direction of arrow H until it enters into contact with the frontal guiding surface (or exterior surface) 325 of slide 32 at the level of cavity 35. To the degree that hook 34 penetrates into cavity 35, for example under the effect of a pressure generated by the elasticity of the backrest 33 of the seat, the teeth 342 and 343 progressively move from the deployed position to the retracted position until they deploy once again inside the cavity 35 (FIG. 3). Hook 34 is then in an affixed position in which teeth 342, 343 are engaged and deployed in cavity 35, and the child car seat is thus locked in the utilisation position.

To obtain unlocking (or disconnection) of hook 34, so as to turn the seat from its utilisation position to one of the installation positions, the hook 34 must be disengaged from cavity 35. This can, for example, be carried out by means of a cable system.

A cable 37, passing through a cable sheath 38, is linked to one of the extremities of the two mobile teeth 342 and 343. The other extremity of the cable 37 is connected to one or several means of control taking the form of a pull handle 39 located for example at the level of the armrests of the child car seat.

When cable 37 is activated by means of pull handle 39, the mobile teeth 342 and 343 move from the deployed position to the retracted position in which they retract into shaft 341. The hook 34 is thus placed in the unlocked position and in such a way that the child car seat can be pivoted.

2$^{nd}$ Embodiment: Base Hook

Base Hook Stem

In reference to FIGS. 6 to 9b, we see a second embodiment of the child car seat according to the invention.

In this particular embodiment, a first locking element 601 is part of the backrest 602 of the seat of the child car seat. The first locking element 601 here is substantially U-shaped bar presenting a frontal guiding surface 6011 and two side guiding surfaces 6012, 6013.

A second locking element, here in the form of hook 603, forms part of the face turned towards the inside of the passenger compartment of the part of the base 604 intended to press against the backrest (not shown here) of the vehicle seat. The hook 603 is mounted free to rotate on shaft 605. Return means, here using two torsion springs 606 placed at each extremity of shaft 605, tend to bring hook 603 back into its connected position. Hook 603 has two slopes 6031 and 6032 intended to cooperate with bar 601 when the seat is pivoted.

A locking pin 607 forms part of backrest 602 and is linked to a return means, here in the form of a compression spring 608, which tends to maintain it in a locked position in which it protrudes from backrest 602. The pin 607 is intended to cooperate with hole 609 in hook 603 in such a manner as to hold it in the locked position when the child car seat is in the utilisation position.

In the normal locking mode, one of the slopes 6031, 6032 of hook 603 enters into contact with bar 601 (FIG. 8c), and pin 607 enters into contact with face 6033 of hook 603. The hook 603 progressively moves into the intermediary unlocked position in which it straddles bar 601 (FIG. 8b), and compression spring 608 compresses so that pin 607 progressively retracts in order to be partly hidden inside backrest 602. When the seat arrives in the utilisation position, the hook 603 moves to the locked position in which it is engaged in bar 601 (FIG. 8a), and pin 607 moves into a locked position in which it cooperates with hole 609. The child car seat is thus locked into the utilisation position and cannot therefore pivot.

In the downgraded locking mode, face 6033 of hook 603 enters into contact with bar 601. The pin 607 also enters into contact with face 6033 of hook 603. The face 6033 of the hook having a significantly curved form, hook 603 progressively moves into an intermediary unlatched position (FIG. 9b). At the same time, pin 607 progressively retracts into backrest 602. When the seat arrives at the utilisation position, hook 603 is in the locked position and pin 607 meshes with hole 609. The child car seat is thus locked in the utilisation position and cannot pivot.

To obtain the unlocking of hook 603, in order to turn the seat from the utilisation position back to one of the installation positions, hook 603 must be freed by disengaging pin 607 from hole 609, and then must be disengaged from bar 601. This can be activated for example using a cable system.

A cable 610, passing through cable sheath 611, is linked to one of the extremities of pin 607. The other extremity of cable 610 is linked to one or several means of control that may take the form of a pull handle 612 located for example at the level of the armrests of the child car seat.

When cable 610 is pulled via pull handle 612, pin 607 moves from a locked position in which it cooperates with hole 609 of hook 603 to a non locked position in which it no longer occupies hole 609 and because of this it frees hook 603. The child car seat can then be freely pivoted.

During the transition of the seat from the position facing the road to one of the installation positions, one of the slopes 6031, 6032 enters into contact with bar 601. Hook 603 progressively moves into an intermediary unlocked position in which one of the slopes 6031, 6032 straddle bar 601. When the child car seat is in one of the installation positions, hook 603 is in the unlocked position.

Correct Latching Indicator

In this second embodiment, we intend the child car seat according to the invention to have a correct latching indicator that allows the user, i.e., the person manipulating the child car seat, to ensure that the seat is locked in the correct utilisation position and therefore that the locking elements are allowing fixation of the upper part of the backrest of the child car seat with its base are affixed in a suitably solid manner.

A warning flag 620 is moveable between a deployed position in which it is visible by the user and a retracted position in which it is hidden in the interior of the base of the child car seat and therefore not visible. The warning flag 620 is associated with an informing bolt 621 leading from the base. A means of return, using for example a compression spring (not shown in the figures), tends to bring the warning flag 620 into its deployed position.

Figure 6:
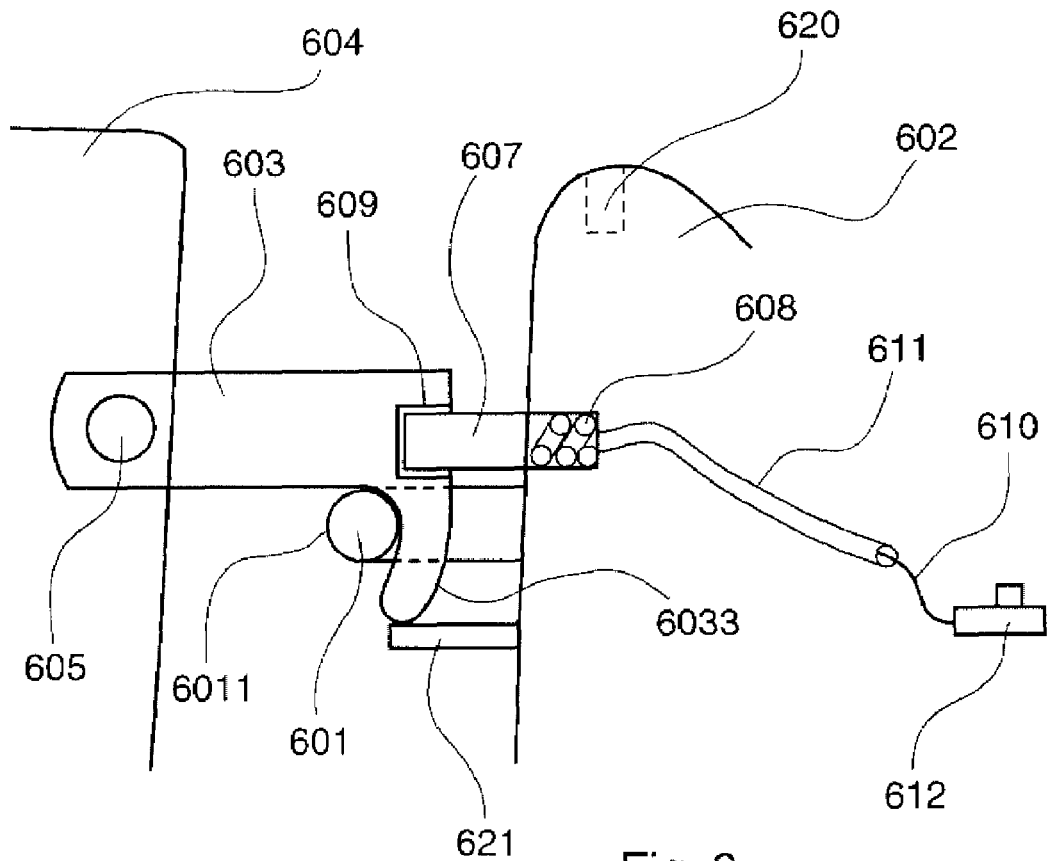
Figure 7:
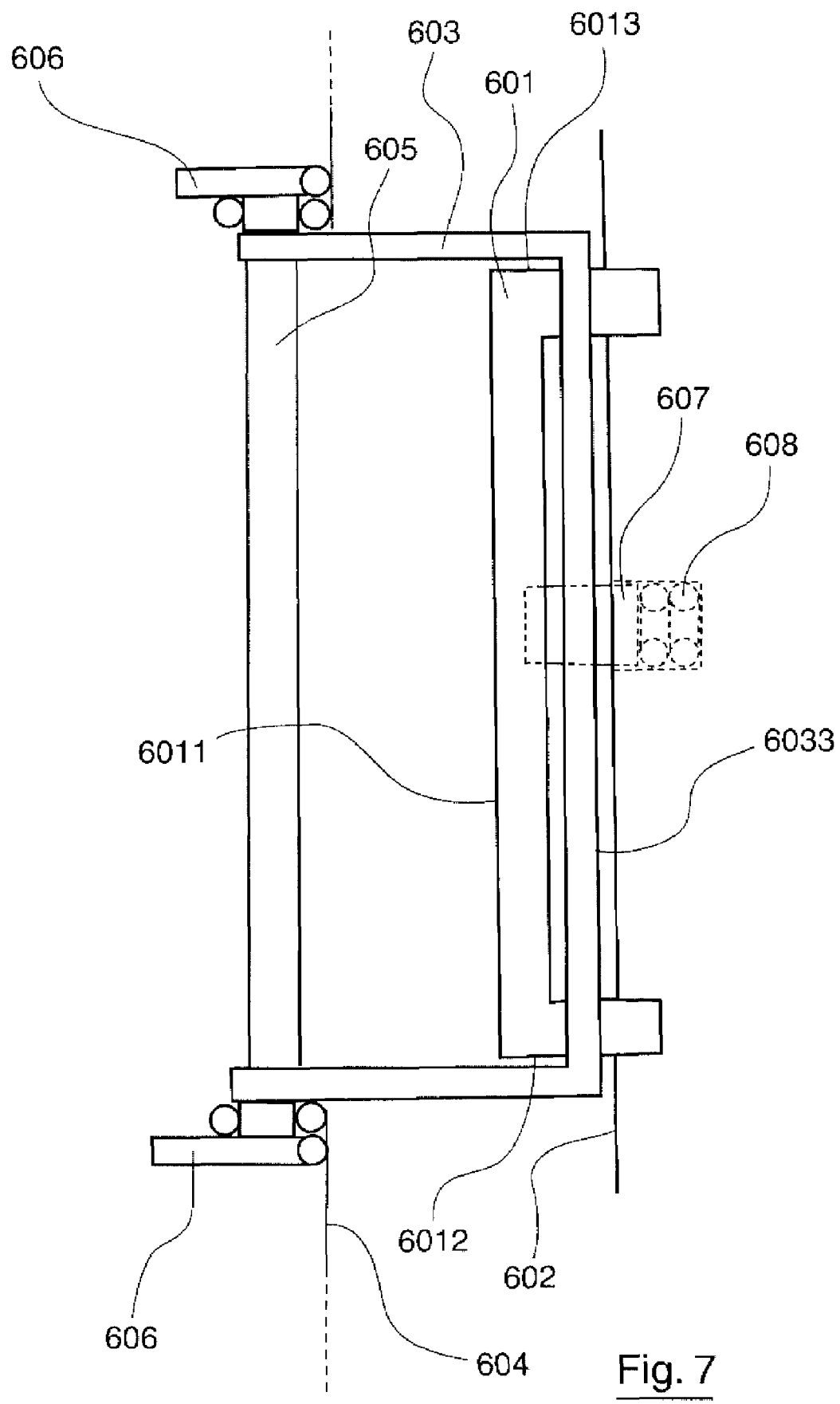
Figure 8A:
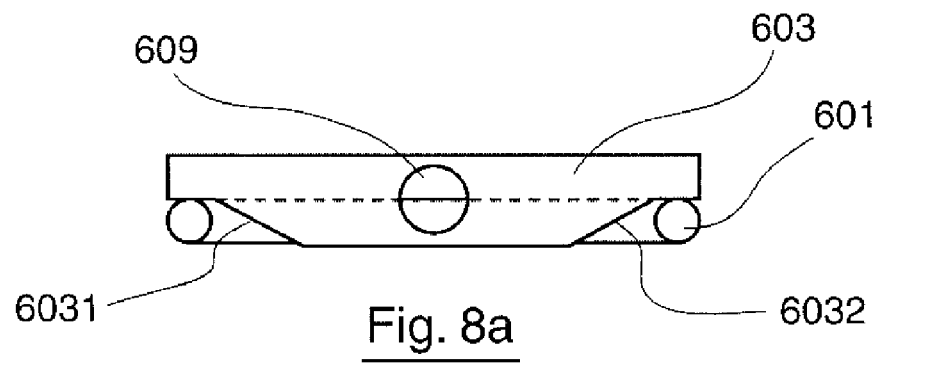
Figure 8B:
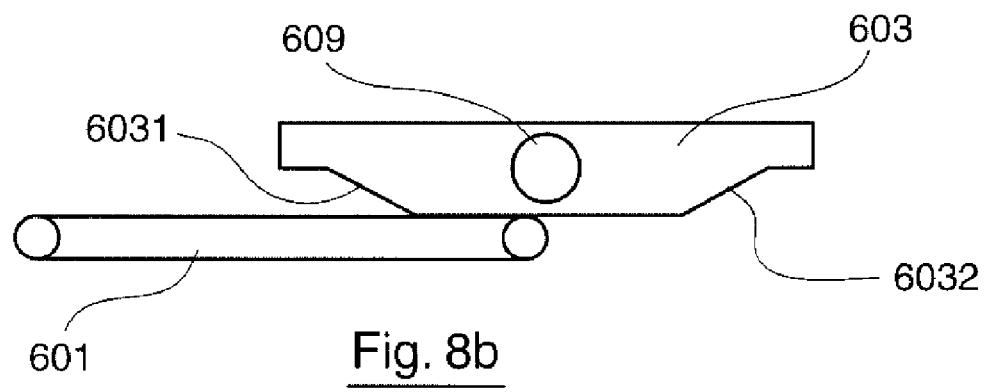
Figure 8C:
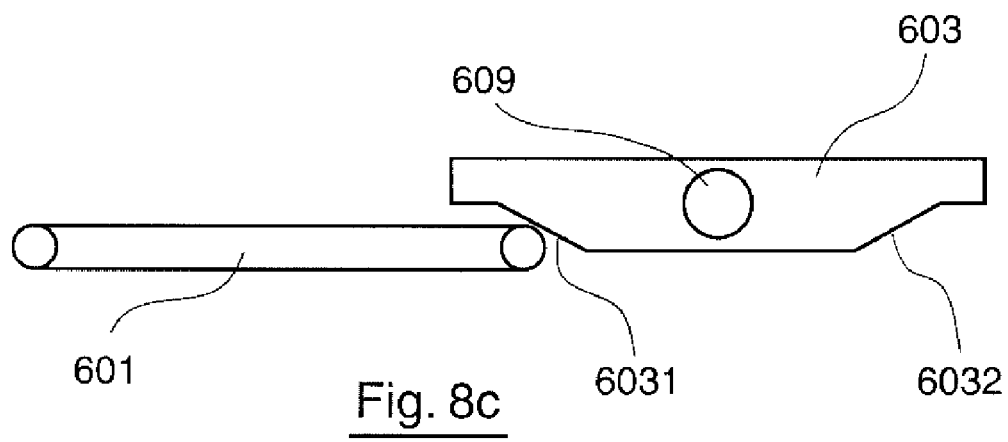

When the child car seat pivots from the installation position to the utilisation position, hook 603 engages bar 601 and enters into contact with the bolt 621. The hook 603 opposes the compression force exerted by the spring on the warning flag 620 in such a way that it moves from its deployed position to its retracted position and becomes non visible by the user of the child car seat (FIG. 6).

The warning flag 620 may be of a particular colour or may bear a message informing the user of the child car seat of the fixation status of the fixation system.

When the child car seat pivots from the utilisation position to the installation position, the hook 603 unlatches and frees bolt 621 in such a way that under the compression effect of the spring, warning flag 620 moves to the deployed position in which it is visible by the user of the child car seat (FIGS. 9a and 9b).

The user is thus in a position to determine whether the hook is in the locked position and therefore if the child car seat is locked in the utilisation position.

3$^{rd}$ Embodiment: See-saw Hook

In FIGS. 10 to 12, we show a third embodiment of the child car seat according to the invention.

In this particular realisation, a locking element formed by a hook 73 forms part of backrest 74 of the seat of the child car seat. The hook 73 here comprises a part forming a shaft 731, a significantly flat part 732 with at each of its extremities a finger 733 intended to cooperate with another locking element forming an anchor point 71 affixed to base 72 of the child car seat. The hook 73 is mounted so that it pivots in relation to the seat in such a way that it can move from a locked position to an unlocked position. A means of return, here constituted by torsion spring 75, tends to bring hook 73 back to the locked position.

The anchor point 71 is affixed to the side of the base turned towards the inside of the vehicle passenger compartment; this part of the base 72 is intended to press against the backrest of the vehicle seat (not shown here). The anchor point 71 here takes the form of a counter shape moulded in base 72. This counter shape 71 has two opposed contact surfaces 711 and 712 notably having ramps 7111, 7112, 7121, 7122, and intended to guide and/or bring back hook 73 to a locked position when the child car seat pivots from an installation position to a utilisation position. This counter shape 71 has in addition two cavities 713 and 714 each forming a housing intended to receive a finger 733 when the seat is locked in the utilisation position. The counter shape 71 also has two inclined bearing surfaces 715 and 716 intended to bring hook 73 into a locked position when the child car seat is in position facing the road and hook 73 latches according to the downgraded mode.

In the normal locked mode, hook 73 moves to the locked position when the child car seat pivots from an installation position to a position facing the road and in the direction of one of the arrows I or J (depending on whether the child car seat is placed on the left or right side of the passenger compartment). During this movement, each finger 733 of hook 73 slides along planes 711, 712 of the counter shape 71. Because of the geometry of planes 711 and 712, and notably the presence of ramps 7111, 7112, 7121, 7122, hook 73 moves progressively into the intermediate unlocked position (FIG. 10). When the child car seat is in the utilisation position, hook 73 moves into the locked position in which each of its fingers 733 cooperates with one of the cavities 713, 714 (FIGS. 11, 12). The child car seat can no longer pivot and is locked in its utilisation position.

In the downgraded mode of locking, the hook 73 moves to the latched position when the backrest of the child car seat is moved in the direction of arrow K (FIG. 12) During this movement, each finger 733 slides over the inclined pressing surfaces 715 and 716 of counter shape 71. Hook 73 thus progressively moves into the intermediary unlocked position, until fingers 733 cooperate with cavities 713 and 714. The child car seat is then locked in its utilisation position and can no longer pivot.

To obtain the unlocking of hook 73, so as to move the seat from the utilisation position to one of the installation positions, hook 73 must be freed by disengaging fingers 733 from cavities 713 and 714. This can, for example, be obtained by using a cable system.

A cable 76, passing through cable sheath 77, is linked to one of the extremities of shaft 731. The other extremity of cable 76 is linked to one or more control means that may take the form of a pull handle 78 located, for example, at the level of the armrests of the child car seat.

When one pulls on cable 76 by means of pull handle 78, the hook 73 moves from the locked position in which the fingers 733 cooperate with cavities 713 and 714 of counter shape 71 to the unlocked position in which fingers 733 no longer cooperate with cavities 713 and 714. The child car seat can then be pivoted freely from the utilisation position to one of the installation positions.

OTHER CHARACTERISTICS

In a variant of the different embodiments previously described, we anticipate a child car seat according to the invention and comprising indexing means, controlling the rotation of the seat and forming a stop, so as to guarantee the proper positioning of the seat in the utilisation position when it is pivoted in that direction.

One embodiment of these limiting means may be that described in patent number EP-1625967 by the same patent applicant.

Another embodiment is shown in FIGS. 13a and 13b, in which the pivoting seat 131 has two stops 1311 and 1312 on its lower part. One mobile stop 132, affixed to the base (not shown), is intended to cooperate with stop 1311 or stop 1312 in the utilisation position, in such a way as to guarantee that seat 131 is correctly positioned in the utilisation position, and that the fixation system of the upper part of the backrest of seat 131 and the base lock correctly.

The mobile stop 132 may assume two positions depending on whether the child car seat is placed on the left or the right side of the passenger compartment of the vehicle.

When the seat is placed on the left side of the vehicle, the mobile stop 132 is placed in the position shown in FIG. 13a. Seat 131 can then be pivoted in the direction of arrow A1 until it arrives in the utilisation position in which mobile stop 132 cooperates with stop 1312 so that seat 131 is correctly positioned in the utilisation position and so that the fixation system locks correctly. Seat 131 may be brought to the installation position by pivoting it in the direction of arrow A2.

When the child car seat is placed to the right side of the vehicle, mobile stop 132 is placed in the position shown in FIG. 13b. Seat 131 can then be pivoted in the direction of arrow B1 until it arrives at the utilisation position in which mobile stop 132 cooperates with stop 1311 so that the seat 131 is correctly positioned in the utilisation position and the fixation system locks correctly. Seat 131 may be brought to the installation position by pivoting it in the direction of arrow B2.

The inclined face of stops 1311, 1312 automatically permit the bringing of mobile stop 132 to the correct position (FIG. 9a or 9b) if a user due to misuse does not position it correctly.

The different parts constituting the fixation systems used in the various embodiments of the child car seat, according to the invention, in particular the hook and anchor point, are constructed from materials having sufficient mechanical characteristics to resist forces resulting from an impact caused for example by an accident. The bars and hooks may be metal, for example. The anchor points used in the first and third embodiments may, for example, be constructed from plastics (PA, POM type or other).

The invention claimed is:

1. A child car seat, comprising:
   a base positionable within a vehicle on a vehicle seat;
   at seat having a backrest, wherein the seat is pivotally disposed on the base such that the seat may pivot between at least a utilization position, where the seat faces a road, and an installation position, where the seat is turned toward a door of the vehicle;
   a first locking element disposed on a vertical part of the base; and
   a second locking element disposed on the backrest at a portion of the backrest adapted to abut against a backrest of the vehicle seat;
   wherein the first locking element comprises a frontal guiding surface and a lateral guiding surface;
   wherein the second locking element comprises a mobile part that interacts with the frontal guiding surface as the backrest moves in a first direction substantially perpendicular to the backrest;
   wherein the mobile part interacts with the lateral guiding surface as the backrest moves substantially parallel to the backrest;
   wherein the frontal guiding surface and the lateral guiding surface cause the first locking element and the second locking element to engage in a locked position as the seat is moved to the utilization position; and
   wherein the first locking element and the second locking element are in an unlocked position as the seat is moved to the installation position.

2. child car seat of claim 1, wherein the installation position comprises a first installation position where the seat is rotated to the left and a second installation position where the seat is rotated to the right, and
   wherein the lateral guiding surface comprises two lateral guiding surfaces that cooperate with the mobile part as the seat is rotated from the first installation position or the second installation position.

3. child car seat of claim of claim 1, further comprising a return element associated with the mobile part to bias the first locking element and the second locking element into the locked position as the seat is moved to the utilization position.

4. child car seat of claim 3, wherein the return element is a spring.

5. The child car seat of claim of claim 1, further comprising an unlocking element to cause the first locking element and the second locking element to become unlocked from one another.

6. The child car seat of claim 5, wherein the unlocking element is remotely activated via a control cable.

7. The child car seat of claim 1, further comprising:
a visual indicator to indicate whether or not the first locking element and the second locking element are in the locked position.

8. The child car seat of claim 1, further comprising:
a locking housing comprising at least a portion of the first locking element,
wherein the lateral guiding surface forms a slide leading to the locking housing.

9. The child car seat of claim 8, wherein the second locking element comprises a hook with at least two mobile teeth, which cooperate with the locking housing to lock the first locking element and the second locking element together.

10. The child car seat of claim 8, wherein the second locking element comprises a hook that pivots around a shaft disposed perpendicularly to the backrest and wherein the hook comprises an extremity that cooperates with the locking housing to lock the first locking element and the second locking element together.

11. The child car seat of claim 1, wherein the mobile part is a hook that see-saws around a horizontal axis to cooperate with at least a portion of the first locking element that comprises a U-shaped member.

12. The child car seat of claim 1, further comprising:
an indexing element to control placement of the seat into the utilization position.

13. The child car seat of claim 12, wherein the indexing element comprises at least one mobile element that assumes at least a first position, permitting rotation of the seat to the right, and a second position, permitting rotation of the seat to the left.

\* \* \* \* \*